Jan. 3, 1928.

S. G. RUSSELL 1,654,667

FISHING REEL

Filed May 8, 1926

INVENTOR
Samuel G. Russell
BY
Chappell Earl
ATTORNEYS

Patented Jan. 3, 1928.

1,654,667

UNITED STATES PATENT OFFICE.

SAMUEL G. RUSSELL, OF KALAMAZOO, MICHIGAN, ASSIGNOR TO SHAKESPEARE COMPANY, OF KALAMAZOO, MICHIGAN.

FISHING REEL.

Application filed May 8, 1926. Serial No. 107,627.

My present improvements relate to the spring winding type of fishing reel illustrated in Letters Patent No. 1,510,904 issued to me October 7, 1924.

The main object of this invention is to provide an improved line guide by means of which the wear upon the line as it is played back and forth or as it runs from or is wound upon the spool is materially reduced.

Objects pertaining to details and economies of the invention will definitely appear from the detailed description to follow. The invention is clearly defined and pointed out in the claims.

A structure embodying the features of my invention is clearly illustrated in the accompanying drawing forming a part of this application, in which.

Figure 1:
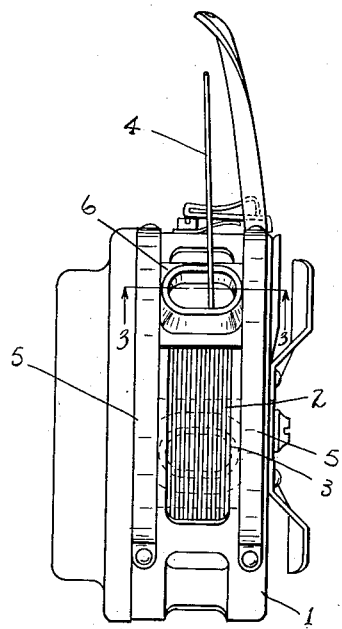
Fig. 1 is a side view of my improved fishing reel.
Figure 2:
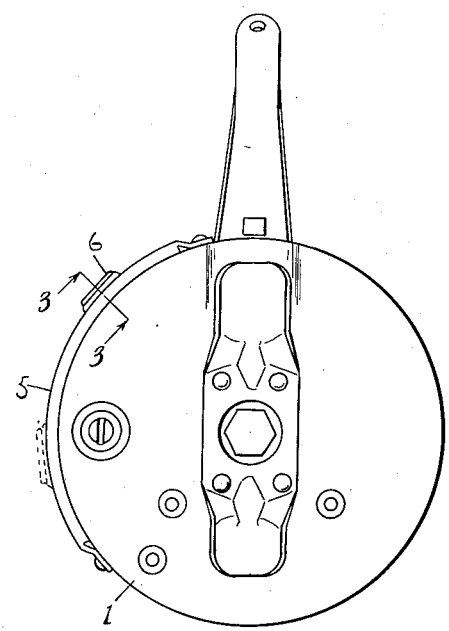
Fig. 2 is a bottom view thereof.
Figure 3:
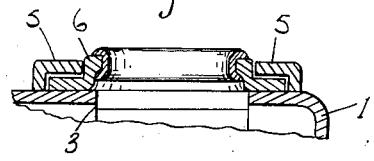
Fig. 3 is a detail section on a line corresponding to line 3—3 of Fig. 1.

Referring to the drawing, the casing or frame 1 is preferably formed up of sheet metal. The spool 2 is driven from a spring driven mechanism such as shown in my said Letters Patent and inasmuch as these details form no part of my present invention and are fully illustrated and described in the said patent, they are not illustrated or described herein.

The casing has an elogated peripheral slot-like opening 3 through which the line 4 is passed. Mounted upon the periphery of the casing are segmental slideways 5 coacting with the casing and providing ways for the line guide 6 which is supported by these slideways for movement in an arc transverse to the axis of the spool so that change in direction of pull on the line will cause this line guide eye to move back and forth in its guide, thus greatly relieving the wear and snubbing action on the line, which results from the eye being located in a fixed position as in my said patent.

Figure 4:
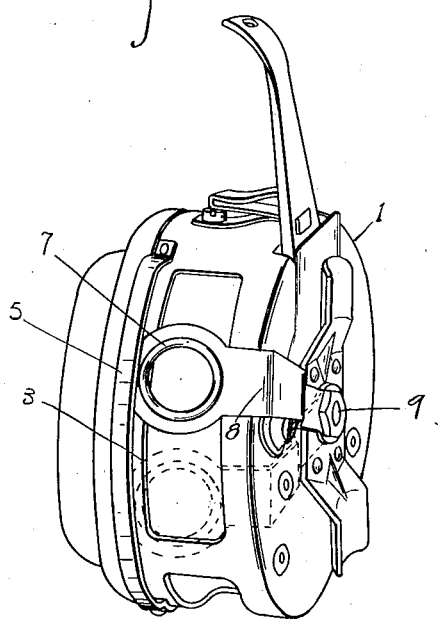
Fig. 4 is a perspective view of a modified form of my invention.

In the modification shown in Fig. 4 a single way member 5 is provided, the line guide eye 7 being provided with an arm 8 which is pivoted at 9, the guide being supported to swing in an arc transverse to the spool, substantially as in Fig. 1. The spool, substantially as in Fig. 1. The slideway 5 prevents the distortion of the line guide under severe stresses or pulls on the line.

I have illustrated my improvements in the form in which I have embodied them commercially. I have not attempted to illustrate other embodiments or adaptations as I believe that this disclosure will enable the embodiment or adaptation as may be desired.

Having thus described my invention what I claim as new and desire to secure by Letters Patent is:

1. In a finishing reel, the combination of a cylindrical casing having a circumferential elongated peripheral opening, a spool within said casing, a pair of opposed segmental slide members mounted on the periphery of said casing at the sides of said opening, and a line guide eye slidably disposed between said slide members and casing for movement in an arc transverse to the axis of the spool.

2. In a fishing reel, the combination of a cylindrical casing having a circumferential elongated peripheral opening, a spool within said casing, a slide member mounted on the said casing at the sides of said opening, and a line guide eye slidably associated with said slide member and casing for movement in an arc transverse to the axis of the spool.

3. In a fishing reel, the combination of a cylindrical casing having a peripheral elongated opening therein, a spool within said casing, a slideway at the side of said opening, and a line guide eye associated with said slideway to move in an arc transverse to the axis of the spool.

4. In a fishing reel, the combination of a frame, a spool, and a line guide eye mounted on said frame for free oscillating movement in an arc transverse to the axis of the spool.

5. In a fishing reel, the combination of a frame having an elongated side opening, a spool within said casing, a slideway at the side of said opening, and a line guide eye associated with said slideway to move transversely to the axis of the spool.

6. In a fishing reel, the combination of a frame, a spool, and a line guide eye mounted on said frame for free oscillating movement transversely to the axis of the spool.

In witness whereof I have hereunto set my hand.

SAMUEL G. RUSSELL.